(12) United States Patent
Baun et al.

(10) Patent No.: US 12,331,718 B2
(45) Date of Patent: Jun. 17, 2025

(54) WIND TURBINE WITH AUXILIARY UNITS

(71) Applicant: Vestas Wind Systems A/S, Aarhus N (DK)

(72) Inventors: Torben Ladegaard Baun, Skødstrup (DK); Jens Demtröder, Rønde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/561,337

(22) PCT Filed: May 12, 2022

(86) PCT No.: PCT/DK2022/050098
§ 371 (c)(1),
(2) Date: Nov. 16, 2023

(87) PCT Pub. No.: WO2022/248001
PCT Pub. Date: Dec. 1, 2022

(65) Prior Publication Data
US 2024/0254969 A1    Aug. 1, 2024

(30) Foreign Application Priority Data
May 26, 2021   (DK) ........................... PA 2021 00556

(51) Int. Cl.
*F03D 13/00*    (2016.01)
*F03D 13/10*    (2016.01)
*F03D 80/80*    (2016.01)

(52) U.S. Cl.
CPC ......... *F03D 13/122* (2023.08); *F03D 80/881* (2023.08); *F05B 2230/60* (2013.01)

(58) Field of Classification Search
CPC ...... F03D 13/122; F03D 80/881; F03D 13/10; F03D 80/82; F03D 1/101; F03D 13/116;
(Continued)

(56) References Cited

U.S. PATENT DOCUMENTS

2017/0314535 A1* 11/2017 Mortensen ............. F03D 13/10
2017/0363071 A1* 12/2017 Baun ....................... F03D 15/00
2018/0335023 A1   11/2018 Trede

FOREIGN PATENT DOCUMENTS

| EP | 2550453 A2 | 1/2013 |
|---|---|---|
| EP | 3276169 A1 | 1/2018 |
| WO | 2011117005 A2 | 9/2011 |

OTHER PUBLICATIONS

International Searching Authority, International Search Report and Written Opinion issued in corresponding PCT Application No. PCT/DK2022/050098, mailed Aug. 17, 2022.
(Continued)

*Primary Examiner* — Julio C. Gonzalez
(74) *Attorney, Agent, or Firm* — Wood Herron & Evans LLP

(57) ABSTRACT

A wind turbine comprising, a tower, a nacelle mounted on the tower, and a rotor for harvesting wind energy by rotation of the rotor about a rotor axis extending in a vertical center plane. The nacelle comprises a main unit and two auxiliary units each housing a first and a second operative component. To obtain a combination of reuse of components and a good weight distribution, the first operative components in the first and second auxiliary units have the same distance to the center plane and the second operative components in the first and second auxiliary units have different distances to the center plane.

19 Claims, 9 Drawing Sheets

(58) Field of Classification Search
CPC .............. F03D 80/821; F05B 2230/60; F05B 2240/14; Y02E 10/72; Y02E 10/74; Y02E 10/76; Y02P 70/50
See application file for complete search history.

(56) References Cited

OTHER PUBLICATIONS

Daish Patent and Trademark Office, examination report issued in corresponding DK Application No. PA 2021 00556, dated Dec. 1, 2021.

* cited by examiner

WIND TURBINE WITH AUXILIARY UNITS

INTRODUCTION

The present disclosure relates to a wind turbine comprising, a tower, a nacelle mounted on the tower, and a rotor for harvesting wind energy by rotation of the rotor about a rotor axis. The nacelle comprises a rotor-supporting assembly forming a load path from the rotor to the tower, and a main bearing attached to the rotor-supporting assembly and supporting the rotation of the rotor relative to the rotor-supporting assembly.

BACKGROUND

Wind turbines increase in size in terms of nominal power output as well as in terms of physical dimensions of the individual parts of the wind turbine. Therefore, the size of the nacelle must also be increased to accommodate the required wind turbine components. Wind turbines are normally transported by road, rail or ship or a combination thereof from the location or locations of manufacture of the individual parts to the operating site where the wind turbine is erected.

SUMMARY

It is an object of embodiments of the disclosure to facilitate further modularity, ease of design and manufacturing and allow for improved assembly operations for wind turbines. It is a further object of embodiments of the disclosure to provide a nacelle which is transportable using ordinary transport means and to lower transportation and handling costs without limiting the possible size of the nacelle, and to allow good balance between weight distribution and modularity.

According to these and other objects, the disclosure, in a first aspect, provides a wind turbine comprising, a tower, a nacelle mounted on the tower, and a rotor for harvesting wind energy by rotation of the rotor about a rotor axis extending in a vertical center plane, the nacelle comprising:

a main unit housing a rotor-supporting assembly forming a load path from the rotor to the tower, the main unit being rotational about a yaw axis extending in a vertical transverse plane. The vertical transverse plane is perpendicular to the center plane. The nacelle further comprising a first auxiliary unit attached to main unit on a first side of the center plane, and a second auxiliary unit attached to the main unit on a second side of the center plane. The second side is opposite the first side of the center plane.

Each of the first and second auxiliary units houses a first and a second operative components, and the first operative components in the first and second auxiliary units have the same distance to the center plane and the second operative components in the first and second auxiliary units have different distances to the center plane.

The different distances to the center plane allow a part of the auxiliary unit, i.e. the auxiliary unit including the second operative component to be mass produced in a common configuration without considering a subsequent location on the right or left side of the main unit and another part, i.e. the first operative component to be attached most advantageously with respect to weight distribution. Accordingly, the disclosure provides a balance between on the one hand, reuse of identical components and thereby facilitate mass production, and on the other hand, a good adaptation to load balancing for selected components.

Examples of a main unit and/or an auxiliary unit include units of any size and shape and configured to be assembled.

The auxiliary and/or the main unit may be formed with size and/or the outer shape comparable to, or equal to, the size and shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced when the main and/or auxiliary unit is a shipping freight container. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

The main unit and the auxiliary unit may be arranged side by side such that the auxiliary units are separated by the center plane in a direction away from a rotational axis defined by the rotor-supporting assembly as opposed to one after the other in the direction of the rotational axis.

Each of the two auxiliary units may have half the size of one shipping freight container following the dimensions and structural specifications in the ISO standard of ISO 668:2013 for series 1 freight containers, and arranged such that the two half parts of the container can be assembled to form one container during transport, and split into two auxiliary units to be arranged e.g. on opposite sides of the main unit. The container may particularly be split in an interface extending in the longitudinal direction of the container, i.e. the longest dimension of the container.

The nacelle may be carried either directly by the tower or indirectly by the tower via an intermediate tower structure. If the wind turbine is of the traditional horizontal axis type, the nacelle is typically carried by a yawing arrangement between the tower top and the nacelle. The disclosure may, however, also relate to a multiple rotor wind turbine of the kind where more than one nacelle are carried by a transverse beam structure which is again carried by the tower, e.g. via a yawing arrangement between the tower and the transverse beam structure.

The disclosure may relate to an upwind wind turbine or to a downwind wind turbine.

The main unit is the part connecting the nacelle to the tower, either directly or indirectly via said intermediate tower structure or structures. The main unit may particularly be the central part of the nacelle and houses parts of the drivetrain such as at least a part of the rotor shaft.

The wind turbine could be a direct drive wind turbine with the generator typically placed outside the nacelle, or the wind turbine could be with the generator located in the main unit. The main unit supports the rotor via the rotor shaft.

The main unit comprises a main frame forming part of the rotor-supporting assembly forming a load path from the rotor into the tower, e.g. via said intermediate tower structure, and e.g. via said yawing arrangement. The main frame may particularly be a casted component.

The main unit may additionally comprise various components for power production, hydraulic control, and computers etc.

In addition to the main frame, the rotor-supporting assembly may comprise a bearing structure and other components supporting the rotor in the wind turbine.

The first and second auxiliary units have substantially the same dimensions, the first operative components are arranged in mirrored position across the center plane, and the second operative components are arranged in substantially the same position within the respective auxiliary units.

The first operative components could be attached directly to the rotor-supporting assembly to define a load path extending directly from the first operative components through the rotor-supporting assembly to the tower. Particularly, the first operative component could be attached directly to, and therefore be carried entirely by, the main frame of the rotor-supporting assembly. For this purpose, the wind turbine may comprise an assembly structure connecting the first operative component to the main frame, e.g. in a releasable manner by use of bolts etc.

The second operative components could be attached indirectly to the rotor-supporting assembly via the auxiliary unit in which it is housed. In one example, the second operative component is carried, e.g. on the floor or on a wall, of the auxiliary unit. The indirect attachment thereby defines a load path from the second operative components through the auxiliary unit to the rotor-supporting assembly and from the rotor-supporting assembly to the tower.

The first operative components could be attached to the rotor-supporting assembly with a center of gravity of the first operative component, herein referred to as $1^{st}$-COG, located exactly in the transverse plane or at a distance from the transverse plane which is smaller than a radial dimension of the tower, and particularly a radial dimension of the tower at the point where the tower interfaces the nacelle.

The auxiliary units may have centers of gravity, herein referred to as AU-COG, wherein a distance from the rotor to the AU-COG is larger than a distance from the rotor to the $1^{st}$-COG, meaning that the AU-COG is behind the $1^{st}$-COG when considering the direction of the wind.

The auxiliary units may both have first and second longitudinal auxiliary walls extending parallel with the center plane. In this embodiment, the first and second operative components are located between the first and second longitudinal auxiliary walls, and these walls extend along an outer surface of the main unit.

The main unit may also defines first and second longitudinal main walls extending parallel with the center plane on opposite sides of the rotor-supporting assembly, and the first longitudinal main wall may extend along an outer surface of the first longitudinal auxiliary wall of one of the auxiliary units, and the second longitudinal main wall may extend along an outer surface of the first longitudinal auxiliary wall of the other one of the auxiliary units.

The first operative components of the first and the second auxiliary units may be placed at the first longitudinal auxiliary walls, e.g. directly against the surface of the walls.

The second operative component of one of the auxiliary units could e.g. be placed at the first longitudinal auxiliary wall, and the second operative component of the other auxiliary unit could be placed at the second longitudinal auxiliary wall.

The first operative component may be carried directly by the main frame, and additionally, it may be attached to the first longitudinal auxiliary wall.

The second operative component of one of the first and second auxiliary units could be attached to the second longitudinal auxiliary wall of that auxiliary unit, or the second operative components could be carried by a floor of the auxiliary units.

The first and second longitudinal auxiliary walls could be joined by third a fourth transverse auxiliary walls extending parallel to the transverse plane on opposite sides of the first and second operative components, e.g. to define a rectangular box-shaped auxiliary unit. The third transverse auxiliary wall is herein defined as the wall being closer to the rotor than the fourth transverse auxiliary wall. The second operative components could be placed with the same distance to the fourth transverse auxiliary wall, and/or the first operative components could be placed with the same distance to the fourth transverse auxiliary wall.

The first operative component may particularly be a component which is heavier than the second operative component, and it may be the heaviest component placed in the auxiliary units.

The first and second operative components may particularly form part of a power conversion assembly, particularly for converting electric power, e.g. for matching a power grid, or for converting the electric power to other forms of energy, e.g. chemically bound energy.

One of the first and second operative components may be a transformer, a converter, a battery, or a fuel cell. In one embodiment, the first operative component is a transformer, and the second operative component is a converter.

The main unit may comprise bus-bars forming a first and a second conductor structure. One of the conductor structures may connect to the second operative component in one of the auxiliary units, and the other one of the conductor structures may connect to the second operative component in the other auxiliary unit. The conductor structures in the main unit may be arranged in mirrored position across the center plane. They may e.g. extend from a generator arranged in extension to the rotor shaft and drivetrain.

The auxiliary units may comprise an auxiliary conductor structure arranged for connection with one of the first and second conductor structures. The auxiliary conductor structure in the first auxiliary unit may be different from the auxiliary conductor structure in the second auxiliary unit to thereby match a right-side location or a left-side location of the auxiliary unit on the main unit.

Each of the first and second auxiliary units may comprise a connection structure for connection of the first operative component. The connection structures may comprise a conductor layout being arranged in mirrored position across the center plane.

In a second aspect, the disclosure provides a method of making a wind turbine according to the first aspect.

The method comprises:
making the first and the second auxiliary units at a first site,
attaching the second operative components inside the first and second auxiliary units while the first and second auxiliary units are at the first manufacturing site,
transporting the first and second auxiliary units to a second site;
inserting the first operative components into the first and second auxiliary units while the first and second auxiliary units are at the second manufacturing site; and
attaching the first operative components to the rotor-supporting assembly;

The step of inserting the first operative components into the first and second auxiliary units may be carried out after a step of attaching the first and second auxiliary units to the main unit, and the step of inserting the first operative components into the first and second auxiliary units may be carried out before a step of attaching the first and second auxiliary units to the main unit.

The method according to the second aspect may include any steps implicit for a wind turbine according to the first aspect.

BRIEF DESCRIPTION OF DRAWINGS

In the following, embodiments will be described with reference to the drawing in which.

DETAILED DESCRIPTION

The detailed description and specific examples, while indicating embodiments, are given by way of illustration only, since various changes and modifications within the spirit and scope of this disclosure will become apparent to those skilled in the art from this detailed description.

Figure 1A:
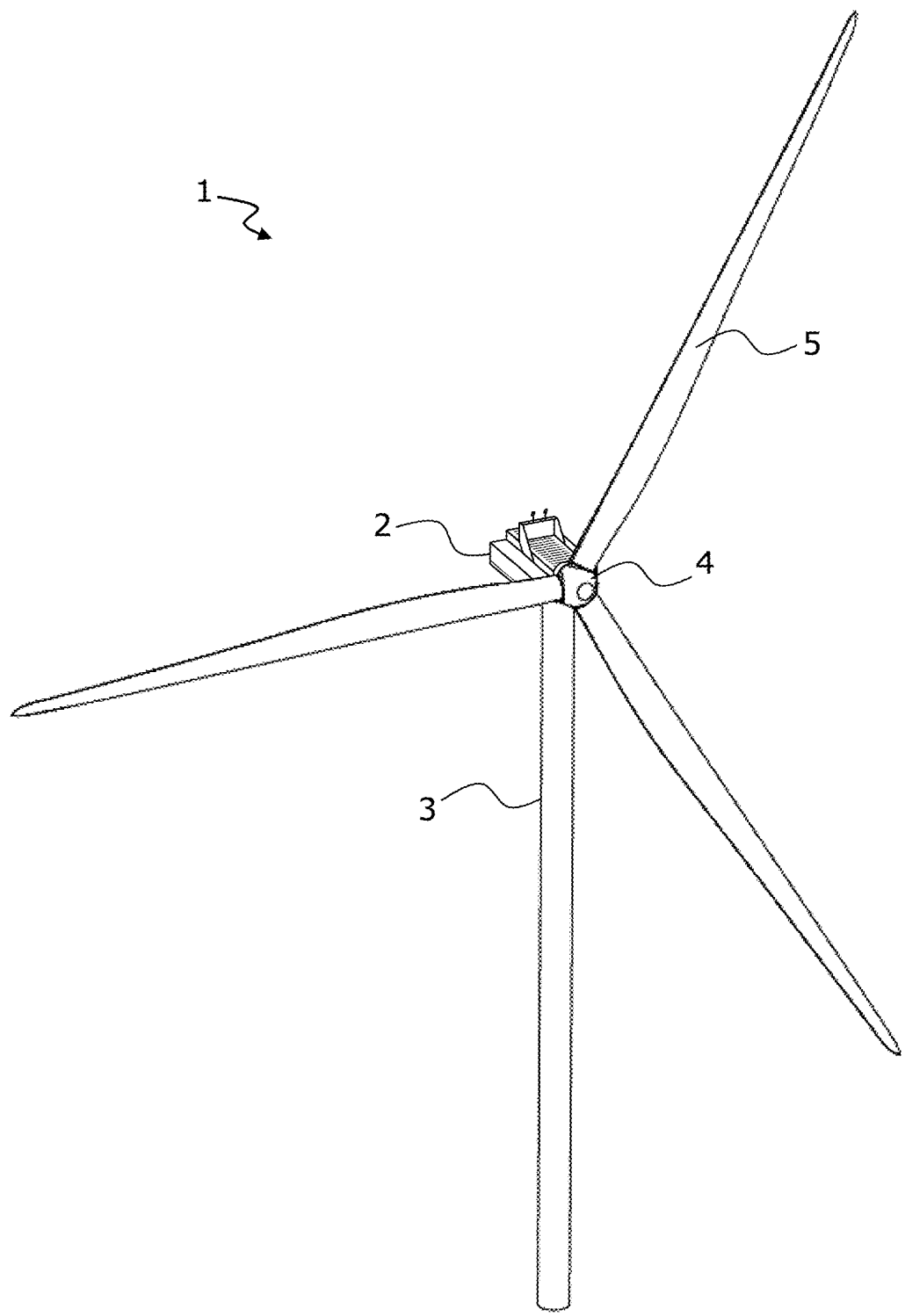
FIGS. 1a, 1b, and 1c illustrate wind turbines with a nacelle mounted on a tower.
Figure 1B:
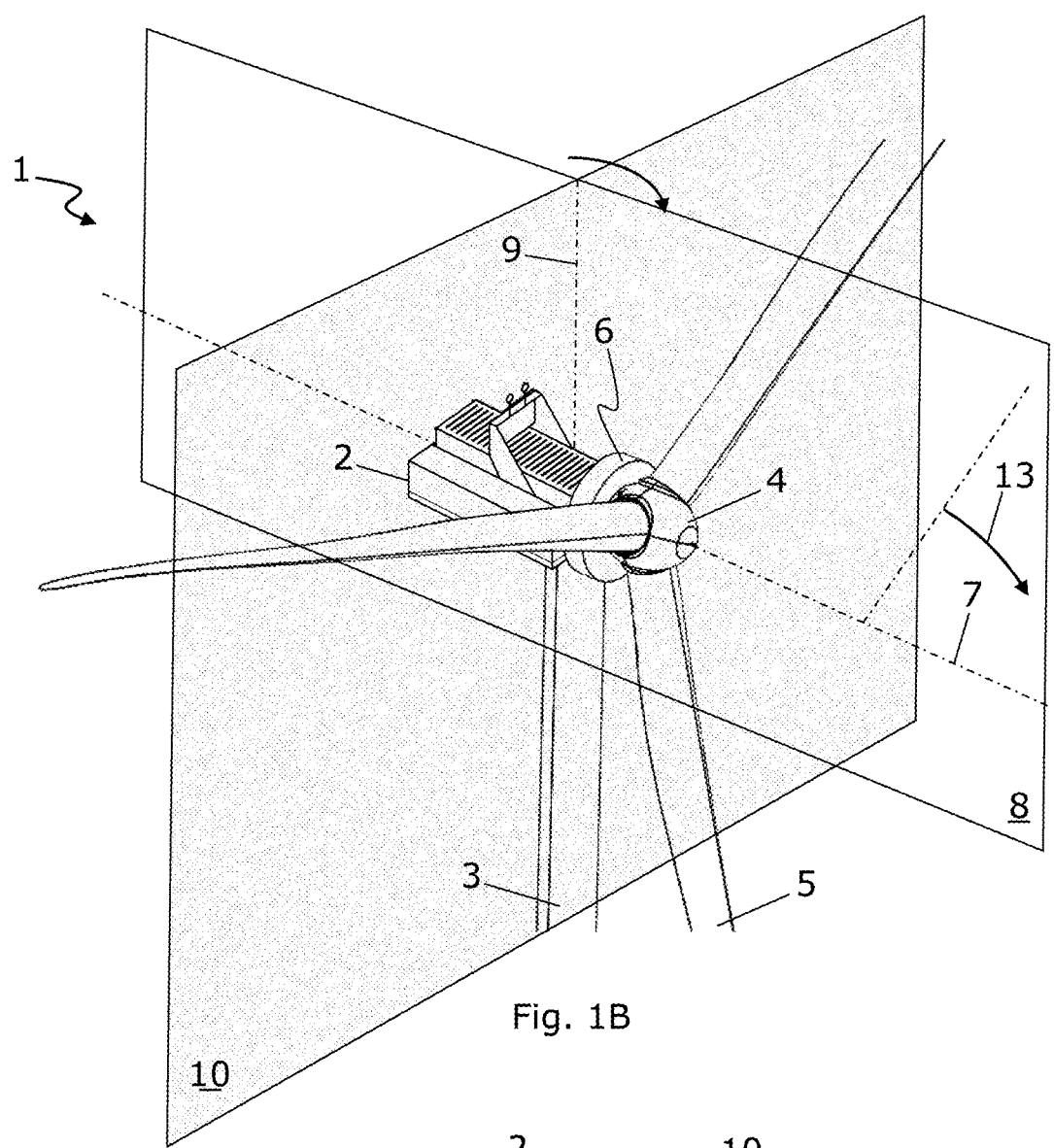

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle. The rotor-supporting assembly further comprises a main frame and main bearing in a main bearing housing connected to the main frame.

By definition herein, the rotor rotates about a rotor axis 7 extending in a vertical center plane 8. To direct the rotor against the wind, the nacelle 2 is rotatable about a vertical yaw axis 9. A vertical transverse plane 10 extends transversely across the nacelle through the yaw axis 9. The transverse plane 10 is perpendicular to the center plane. The yaw axis 9 extends both in the transverse plane 10 and in the center plane 8.

Figure 1C:
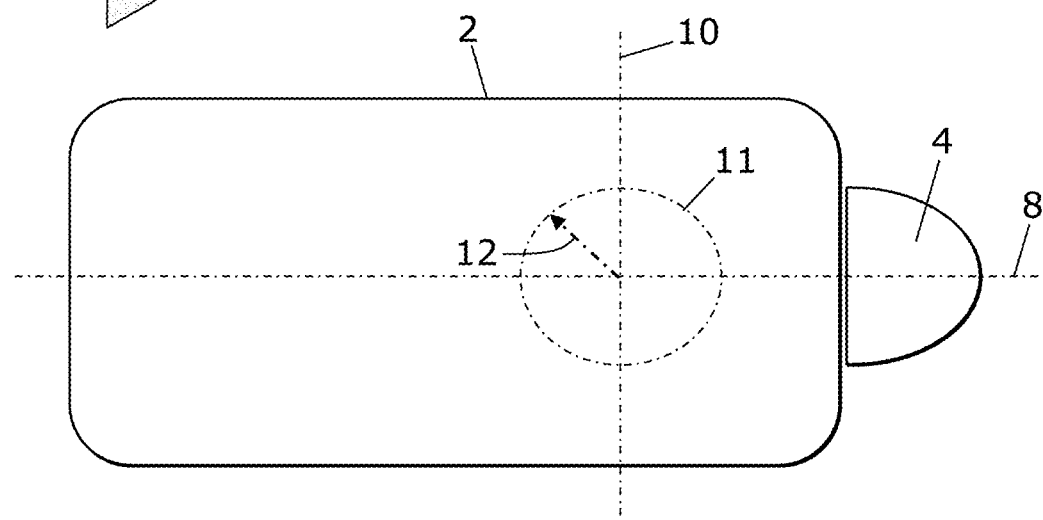

FIG. 1c illustrates the center plane and the transverse plane when the nacelle is seen from above. The tower is indicated by the circle 11 and has a radial dimension indicated by the arrow 12. The indicated radial dimension is a dimension of the tower at the point where the nacelle is attached to the tower, and the circle 11 is dimensioned only to illustrate the location of the tower. The actual dimension of the tower relative to the dimension of the nacelle may be different from the illustration.

Figure 2:
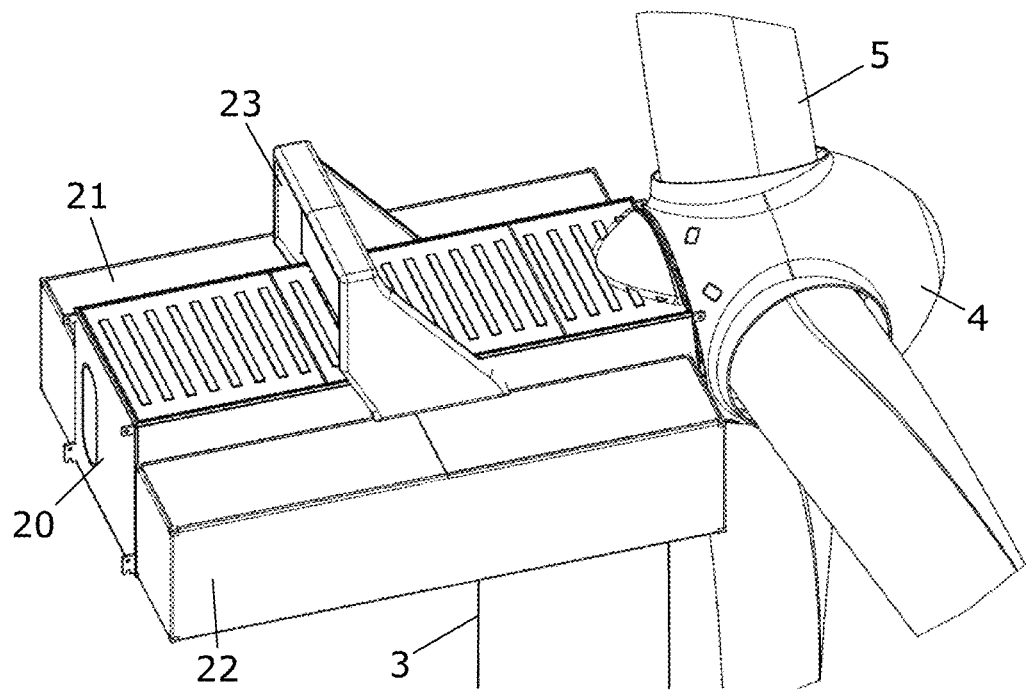
FIG. 2 illustrates a nacelle comprising a main unit and two auxiliary units.

FIG. 2 illustrates a nacelle comprising a main unit 20 and two auxiliary units 21, 22 which house major operative components. Division of the nacelle into a main unit and auxiliary units brings advantages in terms of manufacture and assembly, and transport as further discussed below. A cooling area 23 is arranged on top of the nacelle. The cooling area is formed by a heat exchanger which may form part of the main unit, and/or any of the auxiliary units. The nacelle and more particularly the main unit 20 thereof is mounted on the tower 3 via a rotor-supporting assembly and a yawing arrangement (not shown). The yaw assembly allows the nacelle 2 to rotate about the yaw axis to direct the rotor into the wind.

Figure 3:
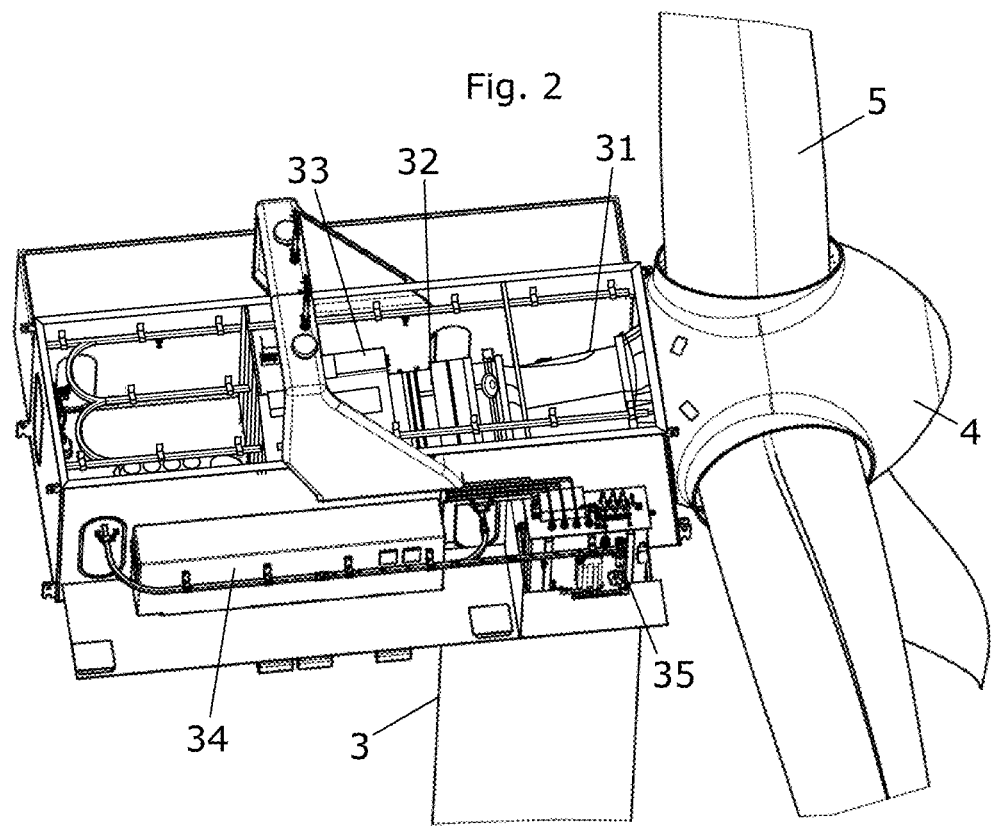
FIG. 3 illustrates a perspective view of the nacelle.

FIG. 3 illustrates a perspective view of the nacelle 2 of FIG. 2. In FIG. 3 the outer walls of the nacelle 2 are, for the sake of explanation, transparent, thereby revealing the interior parts of the nacelle 2 and the wind turbine components accommodated therein. The main unit 20 accommodates a rotor-supporting assembly supporting the rotor. The rotor-supporting assembly comprises inter alia a main frame, and a main bearing 31 attached to the main frame to facilitate rotation of the rotor.

The disclosed wind turbine further comprises a gear arrangement 32 and a generator 33, arranged sequentially behind the hub 4, along a direction defined by the rotational axis of the hub 4. The components in the main unit primarily form part of the drivetrain. In alternative embodiments, the generator is arranged outside the nacelle as illustrated in FIG. 1b.

The auxiliary units 21, 22 accommodate a converter unit 34, and a transformer unit 35 which herein constitute two different operative components being accommodated in the auxiliary unit but carried by the main unit. In alternative embodiments, the operative component could be an electrolysis cell stack or a battery etc. The auxiliary units are attached to main unit on opposite sides of the center plane.

The auxiliary units contain identically functioning operative components, i.e. they both contain e.g. a transformer and a converter or they both contain a battery etc.

The converter units 35 are located non symmetrically relative to the center plane, meaning that they have different distances to the center plane.

Figure 4:
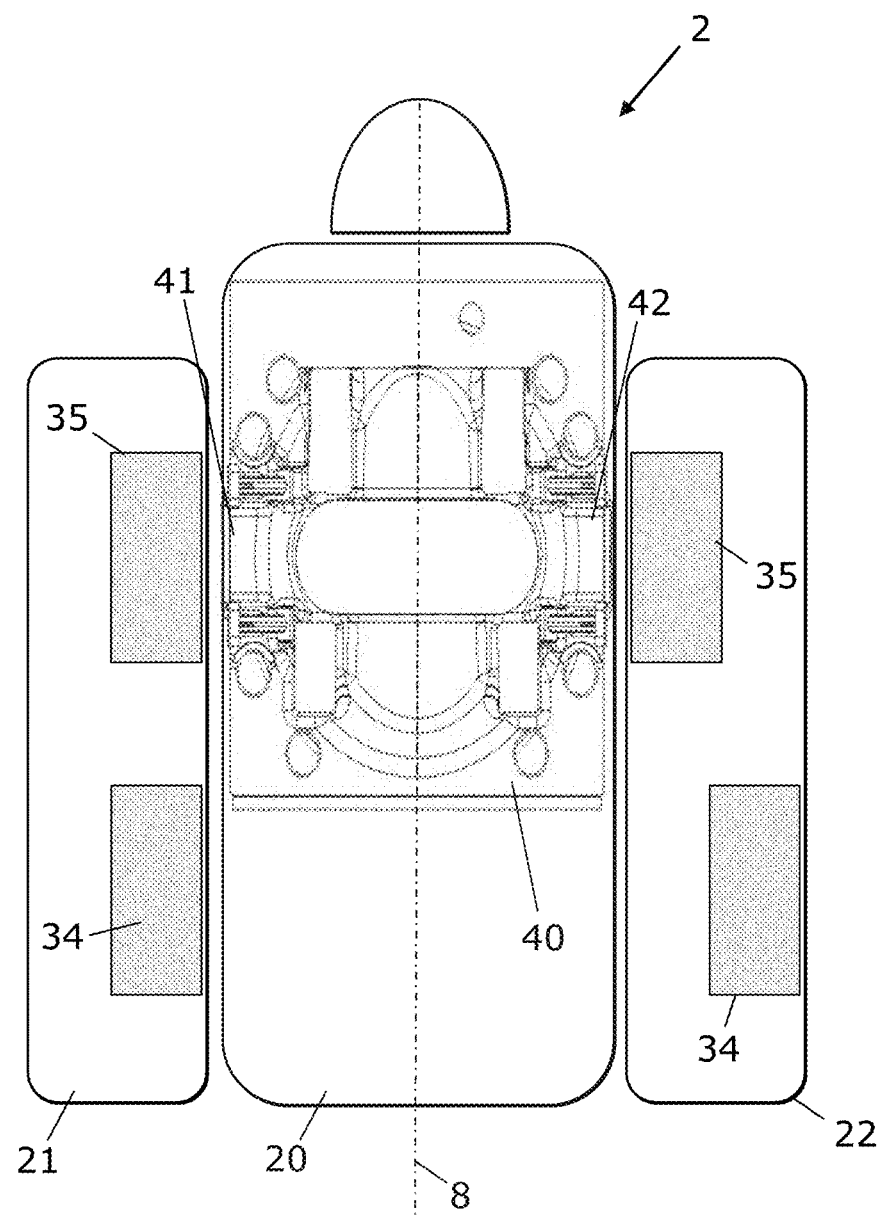
FIG. 4 illustrates the nacelle seen from above.

FIG. 4 illustrates the nacelle 2 seen from above. The main unit 20 contains the rotor-supporting assembly 40, and the auxiliary units 21, 22 contains a converter 34 and a transformer 35. FIG. 4 illustrates that the first operative components, in this case the transformer units 34 are located symmetrically relative to the center plane. This means that the transformers are located with the same distance to the center plane. The second operative components, i.e. in this case the converters, are located non-symmetrically relative to the center plane, i.e. with different distance to the center plane. This allows mass production of substantially identical auxiliary units in terms of layout and associated conductors in units pre-fitted with the second operative component.

The rotor-supporting assembly 40 includes an assembly structure 41, 42 where the first operative components can be attached directly to rotor-supporting assembly, e.g. directly to the main frame. The main frame of the rotor-supporting assembly is fixed to the tower via a yaw assembly allowing rotation about the yaw axis. The rotor-supporting assembly thereby defines a load path extending directly from the first operative components through the rotor-supporting assembly to the tower.

The second operative components are attached indirectly to rotor-supporting assembly via the auxiliary unit. The second operative components are e.g. attached to the floor or a wall of the auxiliary unit, and the auxiliary unit is attached to the main unit. The auxiliary unit, and the main unit thereby define a load path from the second operative components through the auxiliary unit to the rotor-supporting assembly and to the tower.

The first operative component, in this example a transformer, is significantly heavier than the second operative component, in this example a converter, and therefore, this heavy component is suitable for arrangement in the auxiliary unit late in the manufacturing process, e.g. after the auxiliary unit is attached to the main unit, or even after the nacelle is attached on top of the tower. At this point in the manufacturing process, the auxiliary unit is defined as a right or left side auxiliary unit, and the first operative component can be located correctly and carried directly by the rotor-supporting assembly and particularly by the main frame of the rotor-supporting assembly. A transformer for a 10 MW turbine may have a weight upwards of 16 tons as compared to a converter which might weigh e.g. 12 tons.

Figure 5:
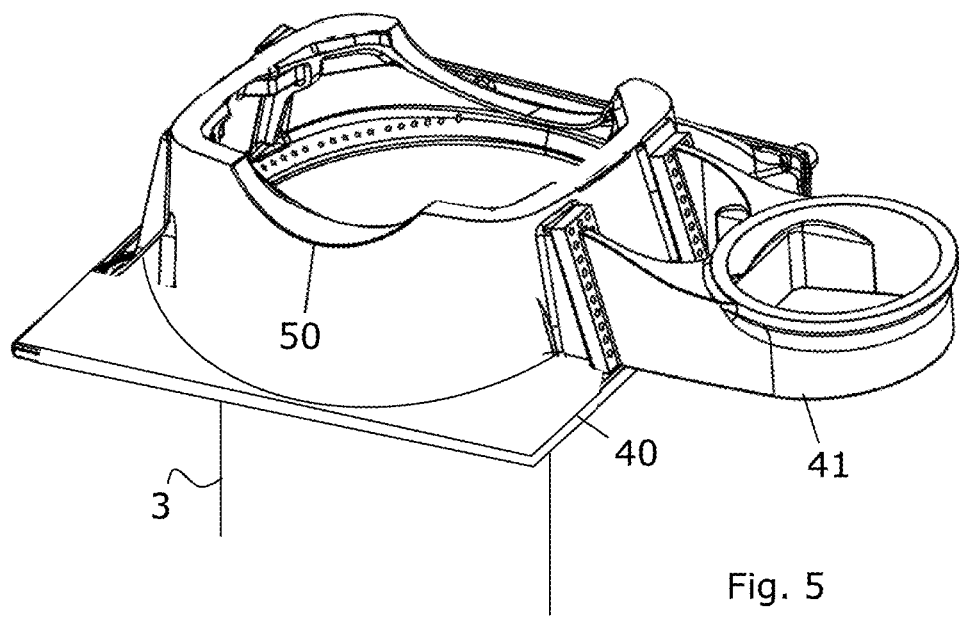
FIGS. 5 and 6 illustrate a part of the rotor-supporting assembly, i.e. the main frame formed as a single piece, casted, component.

FIG. 5 illustrates an embodiment of the main frame formed as a single piece, casted, component. In this embodiment, the assembly structure 41 is bolted directly to the casted component and forms the suspension of the first operative components directly onto the rotor-supporting assembly. The main frame forms a flange 50 for attachment of a main bearing housing.

Figure 6:
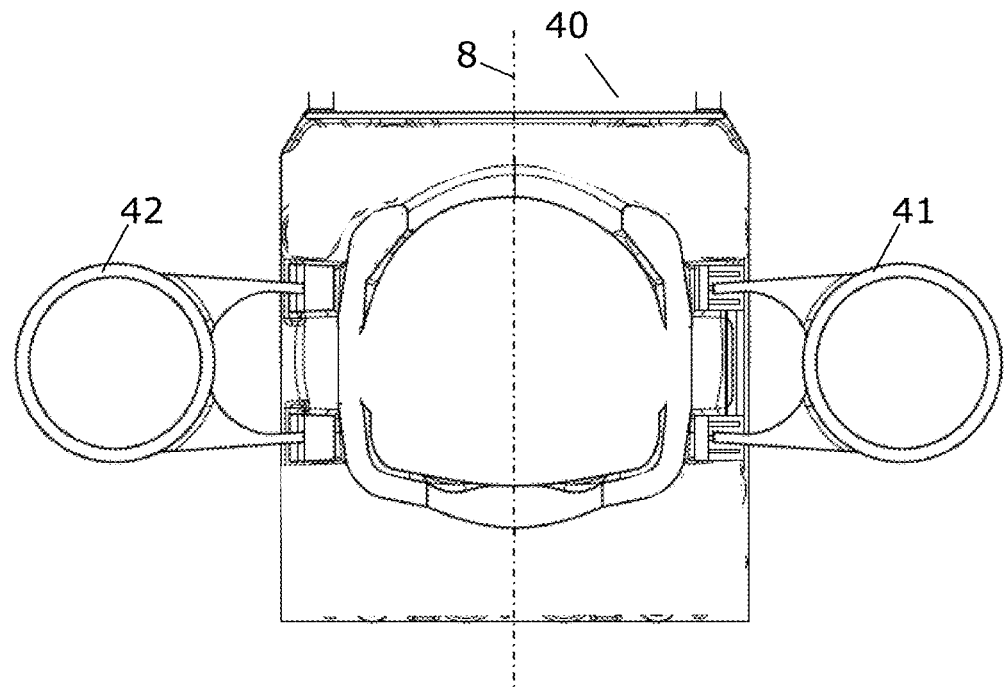

FIG. 6 illustrates the single piece, casted rotor-supporting assembly with an assembly structure 41, 42 on opposite sides and thereby facilitating the direct connection of the first operative components of both auxiliary units directly to the rotor-supporting assembly and particularly to the main frame of the rotor-supporting assembly.

Figure 7:
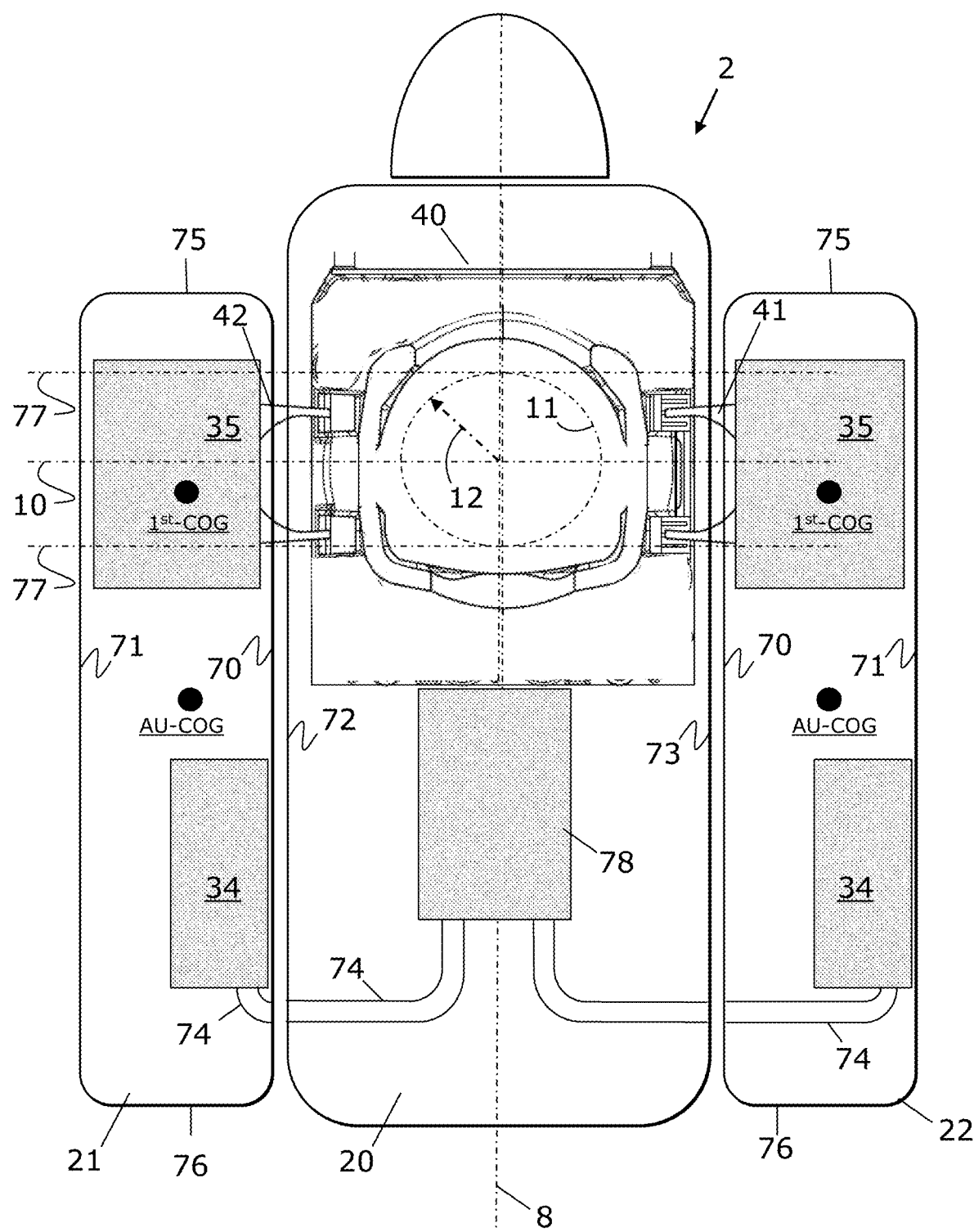
FIG. 7 illustrates details related to the center of gravity of different components.

FIG. 7 illustrates the single piece, casted, main frame in the nacelle of FIG. 4. The first operative components are attached to the rotor-supporting assembly with a center of gravity of the first operative component marked as $1^{st}$-COG. This $1^{st}$-COG is located close to the transverse plane 10 such that the distance from the transverse plane to the $1^{st}$-COG is smaller than the radial dimension 12 of the tower, visualized by the circle 11, and visualized by the dotted lines 77. Note that the relative size of the tower relative to the rotor-supporting assembly is not necessarily correct since the tower is only depicted for illustrating the location of the $1^{st}$-COG.

The auxiliary units have centers of gravity marked in the drawing as AU-COG. A distance from the rotor to the AU-COG is larger than a distance from the rotor to the $1^{st}$-COG.

The auxiliary units both define first and second longitudinal auxiliary walls 70, 71 extending parallel with the center plane 8 on opposite sides of the first and second operative components.

The first longitudinal auxiliary walls 70 of the auxiliary units extend along an outer surface of the main unit. FIG. 7 illustrates that the first operative components are placed at, e.g. directly against, the first walls. The second operative component of one of the auxiliary units 21 is placed at, e.g. directly against, the first wall 70, and the second operative component of the other auxiliary unit 22 is placed at, e.g. directly against, the second longitudinal auxiliary wall 71.

The main unit defines first and second longitudinal main walls 72, 73 extending parallel to the center plane on opposite sides of the rotor-supporting assembly. The first longitudinal main wall 72 extends along an outer surface of the first longitudinal auxiliary wall 70 of one of the auxiliary units and the second longitudinal main wall 73 extends along an outer surface of the first longitudinal auxiliary wall 70 of the other one of the auxiliary units.

The second operative components are wired by a conductor structure. The conductors 74 extend from a generator 78 in the main unit to the second operative components in the auxiliary units.

In the main unit, the conductors 74 of the conductor structures to the first and second auxiliary units extend symmetrically relative to the center plane 8. In the first and second auxiliary units, the second operative components are placed in the same position, but the conductors of the conductor structure are placed differently to provide connectivity to the left and right side of the main unit, respectively.

The first and second longitudinal auxiliary walls are joined by third and fourth transverse auxiliary walls 75, 76 extending parallel to the transverse plane 10 on opposite sides of the first and second operative components. The third transverse auxiliary wall 75 is closer to the rotor than the fourth transverse auxiliary wall.

The first operative component is placed at the third transverse auxiliary wall 75, and the second operative component is placed at the fourth transverse auxiliary wall 76.

When making the wind turbine, the second operative components may advantageously be placed in the auxiliary units in an early stage of the manufacturing, e.g. in a factory facility away from the location where the wind turbine is erected. Herein, this is referred to as a first manufacturing site. The first manufacturing site is where multiple auxiliary units are made, e.g. in an assembly line.

The auxiliary units may be transported to the site where the wind turbine is erected. herein, this site is referred to as second manufacturing site. At this location, the first operative components may be arranged in the auxiliary units. This procedure may be carried out on the ground before the nacelle is mounted on the tower, or after the nacelle is mounted on the tower, and it may occur before the auxiliary units are attached to the main unit or after the auxiliary units are attached to the main unit.

Figure 8:
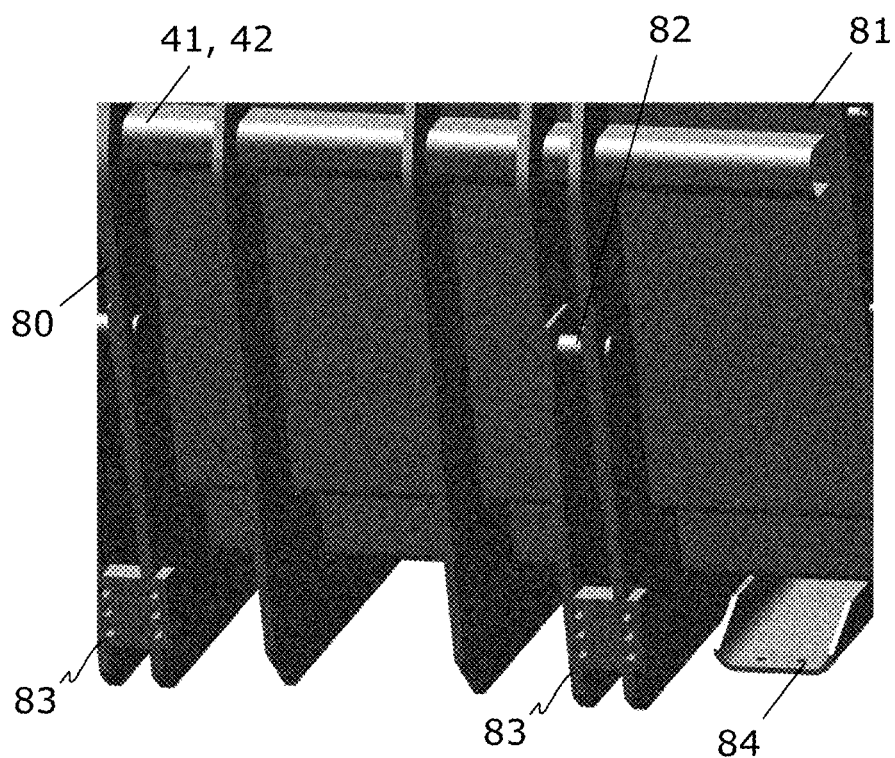
FIGS. 8-10 illustrate different interfaces between an operative component and the main frame.

FIG. 8 illustrates another assembly structure connecting the main frame to an operative component. In the illustrated embodiment, the assembly structure 80 connects the transformer 81 to the main frame. In an upper end of the assembly structure, the transverse pins 82 can be suspended on the main frame, and in the lower end of the assembly structure, the assembly structure may be bolted onto the main frame via the holes 83. The assembly structure further includes a lower support structure 84 on which the transformer can be carried on the floor of the nacelle, e.g. until final assembly and attachment to the main frame. Particularly, the transformer can be placed on the floor of an auxiliary unit and be bolted onto the main frame once the auxiliary unit is attached to the main unit.

Figure 9:
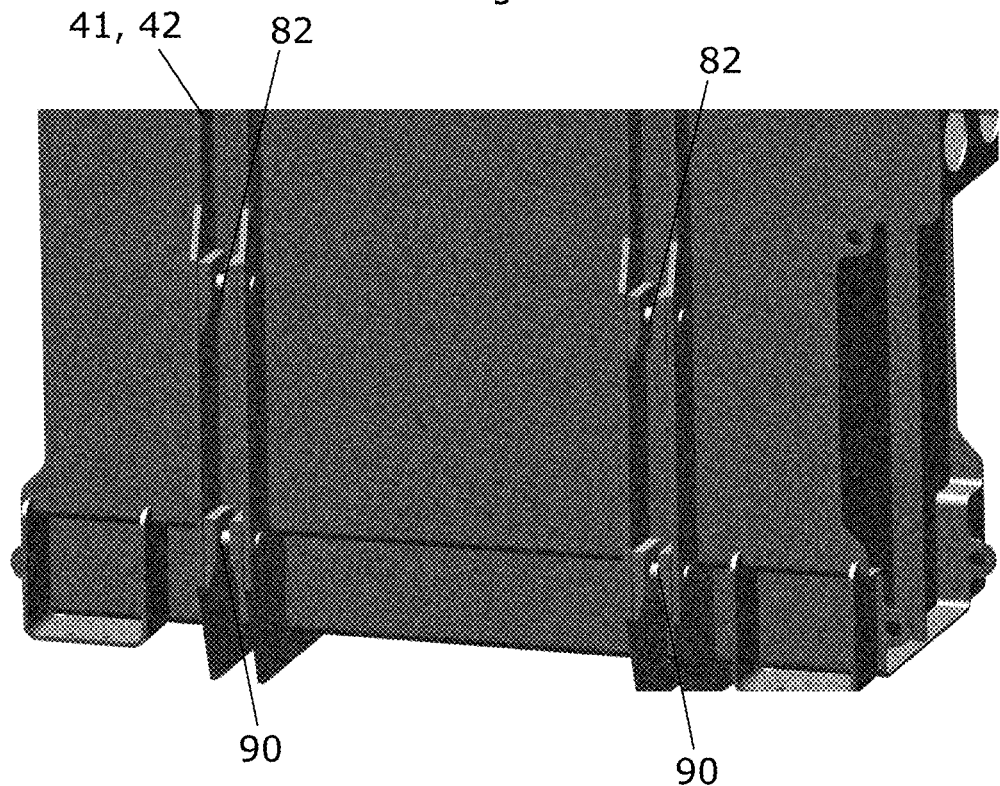

FIG. 9 illustrates an alternative assembly structure in which both the upper end and lower end comprises pins 82, 90 to be suspended on the main frame.

Figure 10:
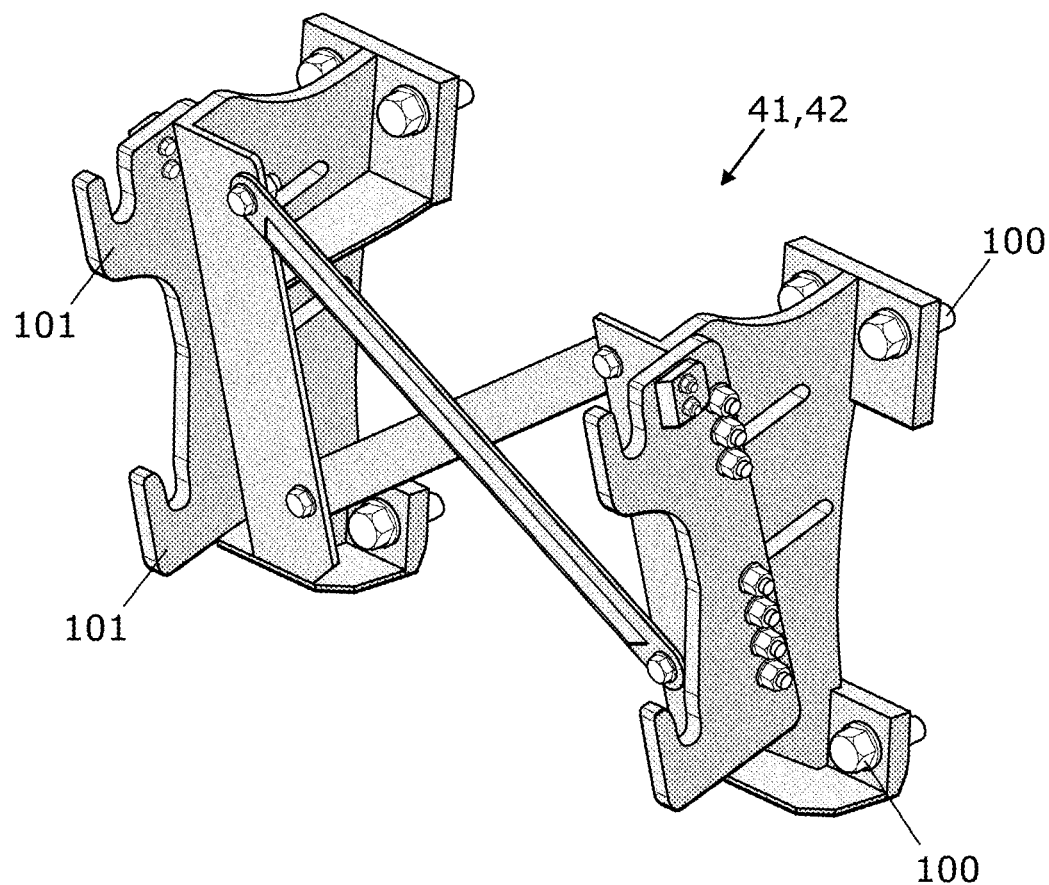

FIG. 10 illustrates an alternative assembly structure in which both the upper end and lower end of one side comprises bolt structures 100 to engage the main frame, and both the upper and lower end of the other side of the assembly structure forms a hook structure 101 for suspension of the operative component.

Figure 11:
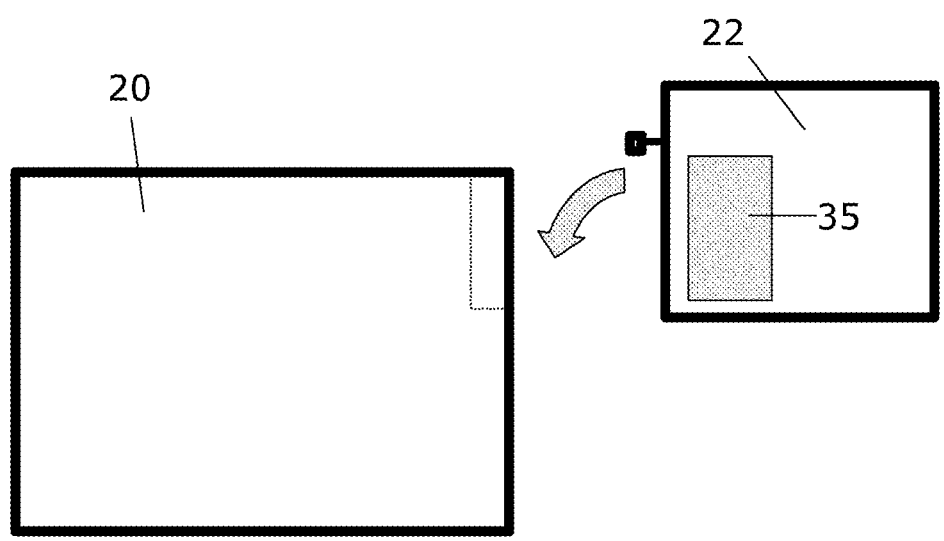
FIG. 11 illustrates that the main unit and the auxiliary unit are separate units.

FIG. 11 illustrates schematically that the main unit and the auxiliary unit are separate units being assembled either before the nacelle is mounted on the tower or after the nacelle is mounted on the tower. The reference numbers refer also to the wind turbine in FIG. 3.

FIGS. 12-15 illustrate four different embodiments of the unit fixation structure forming the interfaces between the main unit and the auxiliary unit. In each of these four illustrations, the main unit 121 and the auxiliary unit 122 are connected by cooperating structures forming the unit fixation structure and being described in further details below.

Figure 12:
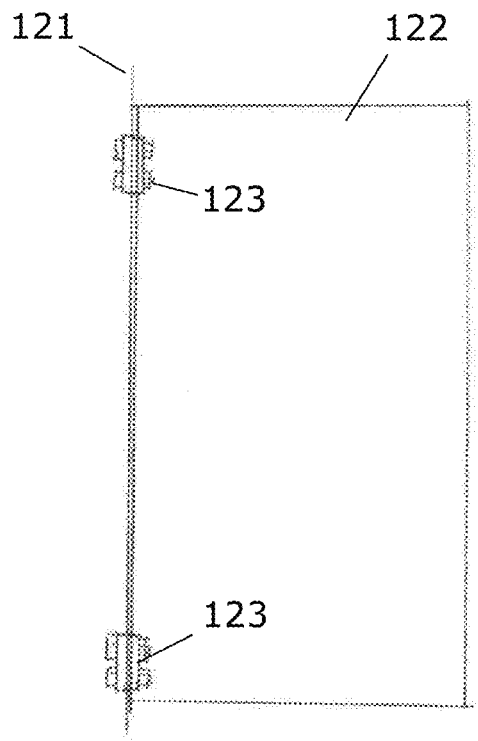
FIGS. 12-15 illustrate different interfaces between the main unit and the auxiliary unit.

In FIG. 12, the cooperating structures are constituted by brackets 123 by which the main and auxiliary units are joined by bolts.

Figure 13:
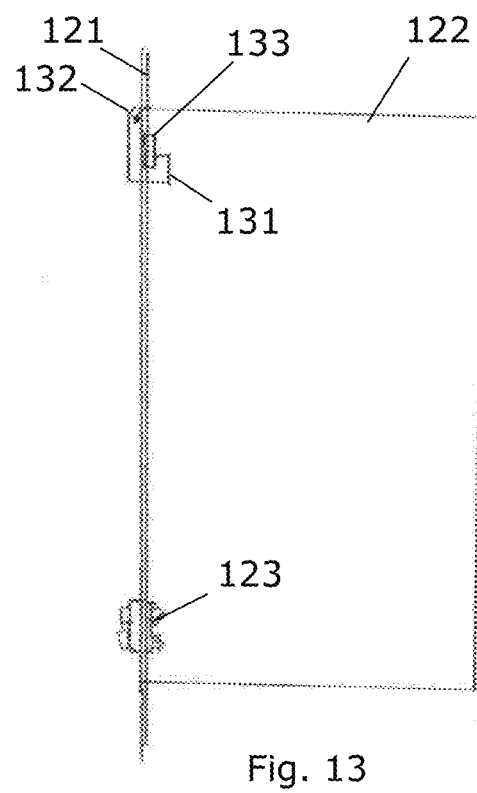

In FIG. 13, the cooperating structures are constituted by a lower bracket 123 like the one used in FIG. 12. At the upper edge, the main unit and auxiliary unit are assembled by a hook 131 pivotally joined to the main unit at the hinge point 132. The hook can rotate as indicated by the arrow 133 and engages the edge-bracket 134 of the auxiliary unit when in the illustrated position. When the lower bracket 123 is removed, and the hook 131 is rotated into the main unit, the auxiliary unit can be lowered to the ground.

Figure 14:
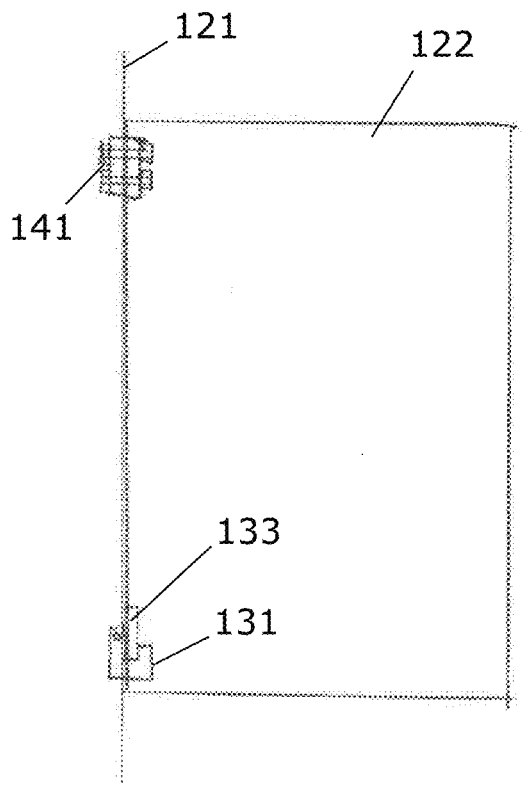

The embodiment in FIG. 14 is comparable to the embodiment in FIG. 13, but where the lower bracket is replaced with an upper bracket 141, and the hook is placed at a lower edge.

Figure 15:
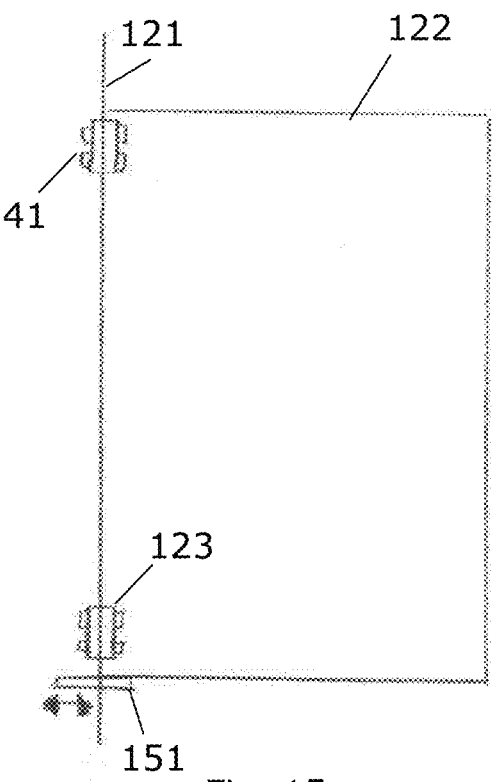

In FIG. 15, a lower and an upper bracket is used for bolting the auxiliary unit to the main unit, and a slidable support 151 supports the lower surface of the auxiliary unit while the bolts are attached. If it is desired to lower the auxiliary unit to the ground, e.g. for replacement or maintenance of the operative component, the slidable support can be slid to the left and the auxiliary unit can be lowered down, e.g. by use of a crane build into the main unit.

In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower. Accordingly, the auxiliary unit is connected to the tower indirectly via the main unit.

In addition to the hook and bracket unit fixation structure illustrated in FIGS. 12-15, an assembly structure (shown e.g. in FIGS. 5, 6, 8, 9, and 10) connects an operative component, e.g. a transformer, directly to the main frame inside the main unit.

The main unit and the auxiliary units may be joined after the operative component is placed in the auxiliary unit, e.g. after a transformer is placed in the auxiliary unit. The operative component may e.g. be placed on the floor of the auxiliary unit, and when the auxiliary unit is fixed to the main unit, it may be desired that the weight of the operative component is carried mainly or completely by the main frame in the main unit.

In the assembly procedure, the load from the operative component is transferred from the auxiliary unit, e.g. from the floor of the auxiliary unit to the main frame. This load transfer may occur during or after the auxiliary unit is attached to the main unit.

In one procedure, the operative component is gripped by the assembly structure while the auxiliary unit is lowered into the position where it is fixed to the main unit. When reaching the assembled position of the auxiliary unit, the load is transferred from the auxiliary unit to the main unit, and particularly to the main frame in the main unit.

In an alternative procedure, the auxiliary unit is lowered into the position where it is fixed to the main unit. Subsequently, i.e. when reaching the assembled position of the auxiliary unit, the load is transferred from the auxiliary unit to the main unit. This may e.g. include that the operative component is fixed to the assembly structure and optionally, that a support between the operative component and the floor of the auxiliary unit is removed or lowered to thereby allow the entire load to be transferred to the main frame.

In another alternative procedure, the auxiliary unit is held at an inclined angle relative to horizontal while being lowered into place. When a first end of the auxiliary unit reaches the correct level, it is fixed to the main unit. The operative component is placed in the opposite, second, end of the auxiliary unit, and at the point in time where the first end is being joined to the main unit, the operative component it is still carried by the auxiliary unit, e.g. on the floor of the auxiliary unit. When the first end is fixed, the second end is lowered, and the operative component is gripped by the assembly structure. During continued lowering of the second end, the weight of the operative component is transferred from the auxiliary unit to the main frame, and finally, the second end of the auxiliary unit is attached to the main unit.

In another alternative procedure, the auxiliary unit is lowered into the position where it is fixed to the main unit. During the lowering of the auxiliary unit, the operative component is gripped by the assembly structure and the lifting force from the crane is simultaneously adjusted for adapting to the changed balance when the operative component is gripped. When reaching the assembled position of the auxiliary unit, the load is transferred from the auxiliary unit to the main unit, and due to the dynamic adjusting of the lifting force, i.e. the adjusting while lowering the auxiliary unit, the balance is preserved.

The invention claimed is:

1. A wind turbine comprising, a tower, a nacelle mounted on the tower, and a rotor for harvesting wind energy by rotation of the rotor about a rotor axis extending in a vertical center plane, the nacelle comprising:
   a main unit housing a rotor-supporting assembly forming a load path from the rotor to the tower, and
   a first auxiliary unit attached to main unit on a first side of the center plane, and
   a second auxiliary unit attached to the main unit on a second side of the center plane, the second side being opposite the first side of the center plane,
   wherein each of the first and second auxiliary units houses a first operative component and a second operative component, the first operative component and the second operative component being parts of a power conversion assembly,
   wherein the first operative component and the second operative component in the first auxiliary unit are respectively the same as the first operative component and the second operative component in the second auxiliary unit,
   wherein the first operative component in the first auxiliary unit and the first operative component in the second auxiliary unit have the same distance to the vertical center plane, and
   wherein the second operative component in the first auxiliary unit and the second operative component in the second auxiliary unit have different distances to the vertical center plane.

2. The wind turbine according to claim 1, wherein the first and second auxiliary units have substantially the same dimensions, the first operative component in the first and second auxiliary units is arranged in mirrored position across the vertical center plane, and the second operative component is arranged in substantially the same position within the first and second auxiliary units.

3. The wind turbine according to claim 1, wherein the first operative component in the first and second auxiliary units is attached directly to the rotor-supporting assembly to define a load path from each of the first operative components through the rotor-supporting assembly to the tower.

4. The wind turbine according to claim 1, wherein the second operative component is attached indirectly to the rotor-supporting assembly in each of the first and second auxiliary units, the indirect attachment defining a load path from the second operative component through the respective auxiliary unit to the rotor-supporting assembly and from the rotor-supporting assembly to the tower.

5. The wind turbine according to claim 1, wherein the main unit is rotational about a yaw axis extending in a vertical transverse plane perpendicular to the vertical center plane, and wherein the first operative component in each of the first and second auxiliary units is attached to the rotor-supporting assembly with a center of gravity of the first operative component located in the transverse plane or at a distance from the transverse plane which is smaller than a radial dimension of the tower.

6. The wind turbine according to claim 1, wherein the first auxiliary unit and the second auxiliary unit have a first center of gravity and a second center of gravity, respectively, wherein a distance from the rotor to the first center of gravity is larger than a distance from the rotor to a center of gravity of the first operative component in the first auxiliary unit, and wherein a distance from the rotor to the second center of gravity is larger than a distance from the rotor to a center of gravity of the first operative component in the second auxiliary unit.

7. The wind turbine according to claim 1, wherein each of the first and second auxiliary units have first and second longitudinal auxiliary walls extending parallel with the vertical center plane with the first and second operative components therebetween, wherein the first longitudinal auxiliary wall of each of the first and second auxiliary units extends along an outer surface of the main unit, and wherein the first operative component is placed at the first longitudinal auxiliary wall of each of the first and second auxiliary units.

8. The wind turbine according to claim 7, wherein the first and second longitudinal auxiliary walls of each of the first and second auxiliary units are joined by a third transverse auxiliary wall and a fourth transverse auxiliary wall extending perpendicular to the vertical center plane on opposite sides of the first and second operative components, the third transverse auxiliary wall being closer to the rotor than the fourth transverse auxiliary wall, and the first operative component or the second operative component in each of the first and second auxiliary units being placed the same distance from the fourth transverse auxiliary wall.

9. The wind turbine according to claim 1, wherein the first operative component is heavier than the second operative component.

10. The wind turbine according to claim 1, wherein one of the first and second operative components is a transformer, a converter, a battery, or a fuel cell.

11. The wind turbine according to claim 10, wherein the first operative component is a transformer, and the second operative component is a converter.

12. The wind turbine according to claim 1, wherein the main unit comprises first and second conductor structures in mirrored position across the vertical center plane and configured for respectively connecting the first and second operative components in the first and second auxiliary units with a component in the main unit.

13. The wind turbine according to claim 12, wherein each of the first and second auxiliary units comprises an auxiliary conductor structure with conductors arranged for connection with one of the first and second conductor structures in the main unit, and wherein the auxiliary conductor structure in the first auxiliary unit is different from the auxiliary conductor structure in the second auxiliary unit.

14. The wind turbine according to claim 1, wherein each of the first and second auxiliary units comprises a connection structure with conductors for electrical connection of the first operative component, the connection structures comprising a conductor layout in mirrored position across the vertical center plane.

15. A method of making a wind turbine according to claim 1, the method comprising:
  assembling the first and the second auxiliary units at a first manufacturing site,
  attaching the second operative component inside each of the first and second auxiliary units while the first and second auxiliary units are at the first manufacturing site,
  transporting the first and second auxiliary units to a second manufacturing site;
  inserting the first operative component into each of the first and second auxiliary units while the first and second auxiliary units are at the second manufacturing site; and
  attaching the first operative component of each of the first and second auxiliary units to the rotor-supporting assembly.

16. The method according to claim 15, where the second manufacturing site is where nacelle is mounted on the tower.

17. The method according to claim 16, where the first operative component is inserted into each of the first and second auxiliary units after the nacelle is mounted on the tower.

18. The method according to claim 15, wherein the step of inserting the first operative component into each of the first and second auxiliary units is after a step of attaching the first and second auxiliary units to the main unit.

19. The method according to claim 15, wherein the step of inserting the first operative component into each of the first and second auxiliary units is before a step of attaching the first and second auxiliary units to the main unit.

* * * * *